Sept. 3, 1946.   H. L. KELLER   2,407,017
POTATO SACKER
Filed Oct. 5, 1943   3 Sheets-Sheet 3
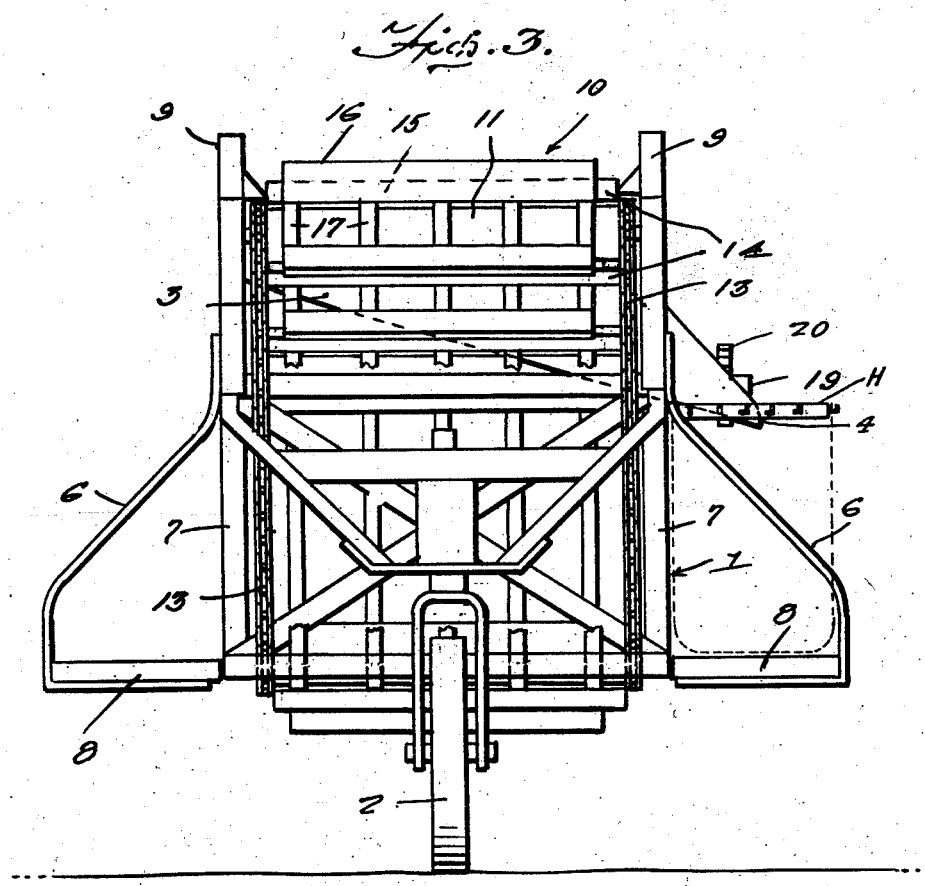
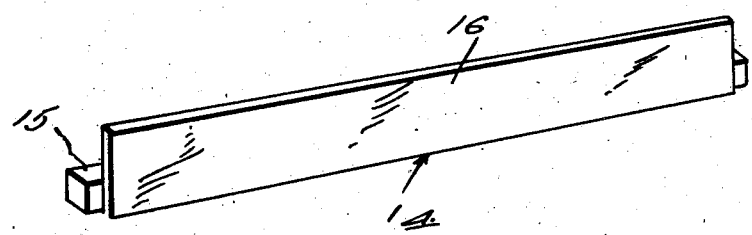
Inventor
HERMAN L. KELLER

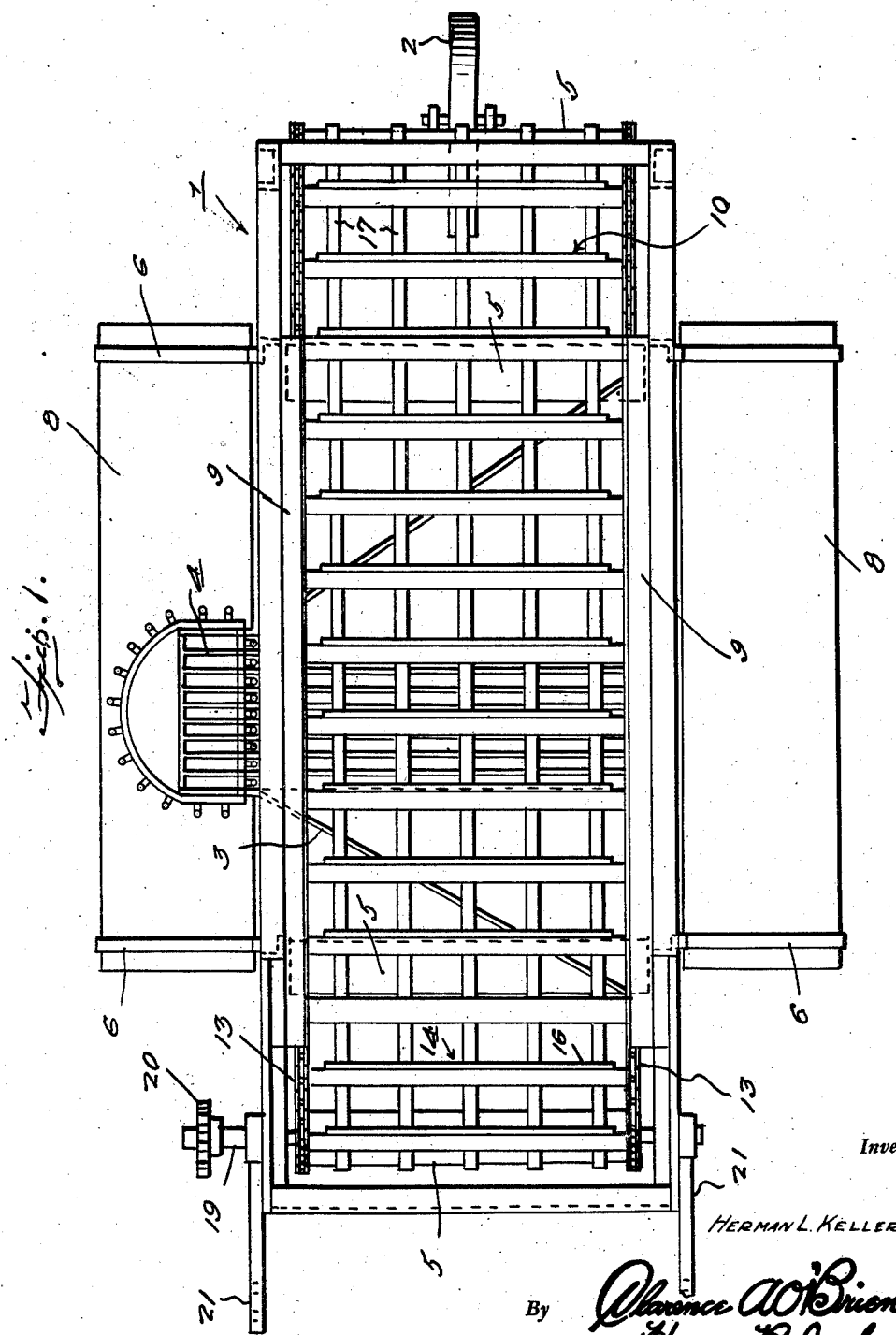

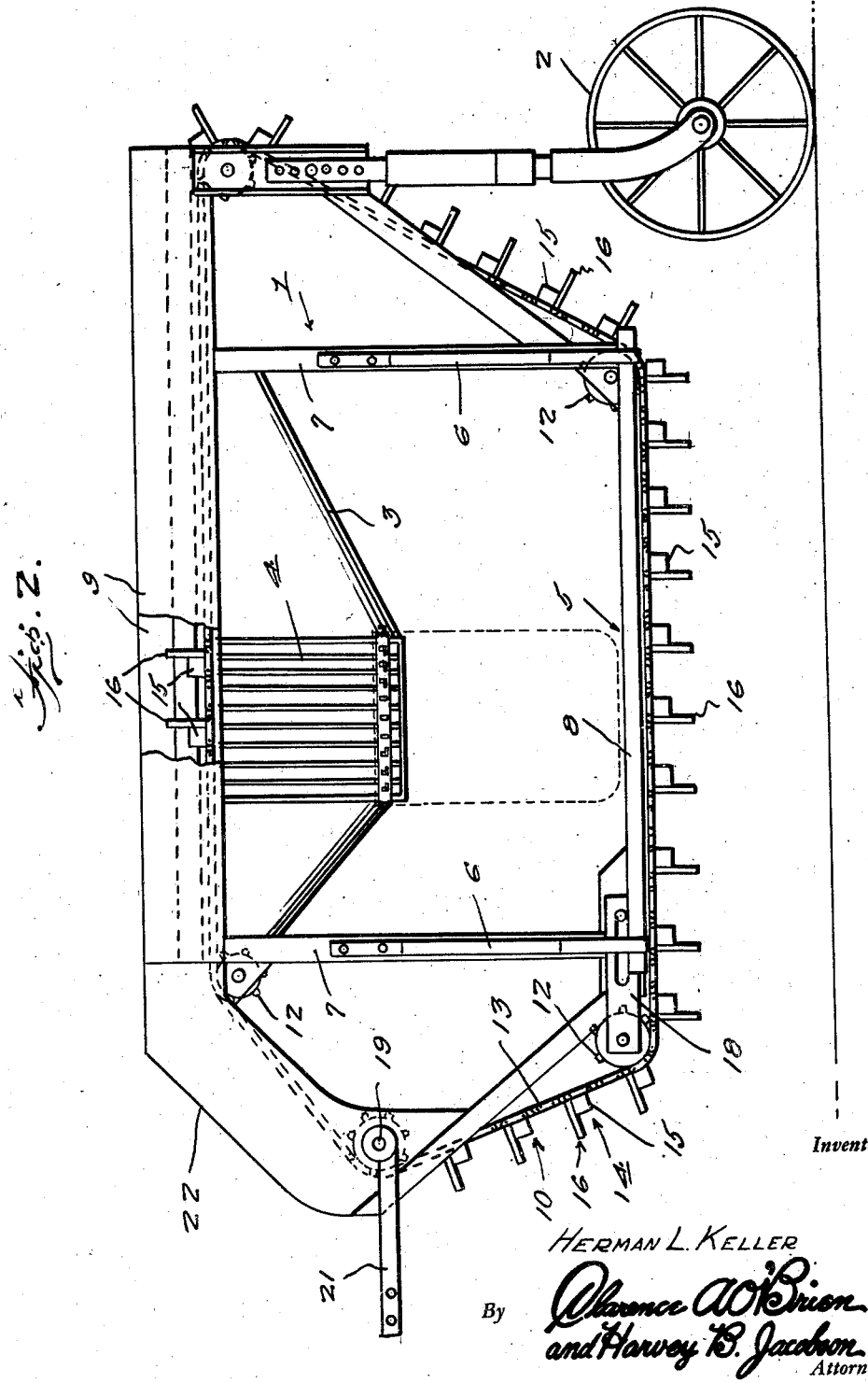

UNITED STATES PATENT OFFICE 2,407,017

POTATO SACKER

Herman L. Keller, Decherd, Tenn.

Application October 5, 1943, Serial No. 505,080

1 Claim. (Cl. 55—51)

The present invention relates to new and useful improvements in potato sackers, and has for its primary object to provide, in a manner as hereinafter set forth, a device of this character which is adapted to be expeditiously connected to a conventional potato digging machine for receiving the potatoes as they are discharged therefrom and sacking said potatoes.

Another important object of the invention is to provide a potato sacker of the aforementioned character comprising an endless conveyor for moving the potatoes, which conveyor is adapted to be driven from the digging machine.

Other objects of the invention are to provide a potato sacking machine of the character described which will be comparatively simple in construction, strong, durable, highly efficient and reliable in use, compact, light in weight and which may be manufactured at low cost.

All of the foregoing, and still further objects and advantages of the invention will become apparent from a study of the following specification, taken in connection with the accompanying drawings wherein like characters of reference designate corresponding parts throughout the several views, and wherein:

Figure 1 is a top plan view of a potato sacking machine constructed in accordance with the present invention.

Figure 2 is a view in side elevation of the machine, showing an upper portion thereof broken away.

Figure 3 is a view in rear elevation.

Figure 4 is a detail view in perspective of one of the endless conveyor sweeps.

Referring now to the drawings in detail, it will be seen that the embodiment of the invention which has been illustrated comprises an elongated frame structure of suitable dimensions and material which is designated generally by reference numeral 1. The rear end of the frame structure 1 is adjustably supported on a caster wheel 2. Mounted in the upper portion of the frame structure 1 is a hopper 3 including an inclined grill or screen 4 which functions as a screening discharge chute. A platform 5 is mounted in the lower portion of the frame structure 1 below the hopper 3. Brackets 6 are mounted on the uprights 7 of the frame structure 1. Planks 8 are mounted on the brackets 6, said planks constituting running boards in the form of lateral extensions of the platform 5 to accommodate the sacks and necessary workmen.

Upstanding sideboards 9 are mounted longitudinally on the upper portion of the frame structure 1. An endless screening conveyor 10 is operable longitudinally around the frame structure 1, the upper flight of said conveyor traveling between the sideboards 9, the lower flight of said conveyor passing beneath the platform 5. The endless conveyor 10 is trained around rollers 11 which are journaled transversely in the front, rear, upper and lower portions of the frame structure 1, said rollers having sprocket wheels 12 fixed on their ends.

The conveyor 10 includes endless sprocket chains 13 which are trained over the sprocket wheels 12. The endless chains 13 carry sweeps 14, said sweeps including bars 15 of wood or other suitable material which are secured transversely on said chains 13. Strips 16 of rubberized fabric are mounted on the bars 15. Mounted on the bars 15 are spaced, longitudinally extending endless fabric belts or the like 17. One of the rollers 11 is adjustably mounted, as at 18, on the lower front portion of the frame structure 1 for regulating the tension of the endless conveyor 10.

As illustrated to advantage in Figure 1 of the drawings, the shaft 19 of the forwardmost roller 11 projects laterally from the frame structure 1 and has fixed thereon a sprocket wheel 20. The sprocket wheel 20 is to be driven by an endless sprocket chain (not shown) from the rear end of the usual conveyor of a conventional potato digging machine. Arms 21 are journaled on the shaft 19. The arms 21 are to be secured to the potato digger for attaching the sacker thereto and for supporting the forward end of the frame structure 1 thereon. The shaft 19 is operable in the lower end portion of an inclined trough 22 on the upper portion of the forward end of the frame structure 1. The endless conveyor 10 is operable in the trough 22.

It is thought that the operation of the machine will be readily apparent from a consideration of the foregoing. Briefly, the potatoes from the digging machine are deposited in the trough 22. The endless conveyor 10 moves the potatoes upwardly in the trough 22 over the hopper 3. When the potatoes enter between the sideboards 9, said potatoes drop through the openings or spaces defined by the members 14 and 17 of the endless conveyor 10 into the hopper 3. From the hopper 3 the potatoes gravitate into a bag which rests on one of the running boards and is held in position beneath the discharge mouth of said hopper by a suitable bag holder H as shown.

It is believed that the many advantages of a potato sacker constructed in accordance with the present invention will be readily understood, and although a preferred embodiment of the machine is as illustrated and described, it is to be understood that changes in the details of construction and in the combination and arrangement of parts may be resorted to which will fall within the scope of the invention as claimed.

What is claimed is:

A unitary potato screening and sacking trailer attachment for a potato digging and elevating machine, comprising an elongated rigid frame, wheeled supporting means for the rear end of the frame, a hopper mounted in the upper portion of said frame and including an intermediate portion in the form of a laterally inclined screening discharge chute, an endless screening conveyor carried by the frame and guided for travel to provide a flight moving upwardly and rearwardly at the front of the frame, a flight moving rearwardly and horizontally over the hopper, a flight moving downwardly at the rear of the frame, and a flight moving forwardly and horizontally at the bottom of the frame in spaced relation to and below the hopper, means to hitch the front end of the frame to the rear of the potato digging and elevating machine to be drawn and supported by the latter, means at the front of the frame to facilitate driving the conveyor, running boards along the sides of the frame near the bottom of the latter and at opposite sides of the last named flight to accommodate sacks and workmen, and means to support a sack in position on one of the running boards to receive potatoes from the discharge chute.

HERMAN L. KELLER.